Aug. 4, 1959

M. J. TAUBENSLAG ET AL 2,898,460

D.C. DISCRIMINATOR GATING CIRCUIT

Filed May 13, 1955

INVENTORS
MORRIS J. TAUBENSLAG
EDWARD G. MAY

BY

ATTORNEYS

United States Patent Office 2,898,460
Patented Aug. 4, 1959

2,898,460

D.C. DISCRIMINATOR GATING CIRCUIT

Morris J. Taubenslag and Edward G. May, Baltimore, Md., assignors, by mesne assignments, to the United States of America as represented by the Secretary of the Navy Application May 13, 1955, Serial No. 508,331

6 Claims. (Cl. 250—27)

The present invention relates to gating of signals at chosen D.C. (direct current) levels and more particularly relates to a D.C. discriminator gating circuit for gating of signals wherein the D.C. levels may be variable and wherein extremely long pulse duration can be accomplished.

Various types of electronic gates have been known to the prior art, for example in electronic computers it is common to pass pulses to a counter through electronic gates which when a gate is open (non-conductive), do not reach the counter, but which when a gate is closed (conductive) permit the pulses to enter the counter. Such systems may discriminate between positive and negative pulses and may depend upon the conducting or non-conducting operation of a particular tube. An example of such a gate circuit is to be found in U.S. Patent No. 2,597,796 for Electronic Cathode Gate, issued May 20, 1952 to Lawrence D. Hindall.

However prior art devices were not suitable for gating of signals at chosen D.C. levels wherein the D.C. levels may be variable and may be of extremely long duration as for example for use in devices such as antenna simulators.

The instant invention overcomes these and other deficiencies of the prior art devices and in addition provides a discriminating gating circuit which is simple in design, has relatively few parts, is reliable in operation and the apparatus of which is economical to manufacture.

Accordingly, an object of the invention is to provide means for gating of signals at chosen D.C. levels.

Another object of the invention is to provide means for gating signals at variable levels where the gating period will be of extremely long duration.

Still another object of the invention is to provide discriminator gating apparatus for gating of signals at variable D.C. levels when the gated increments will be of long duration for pulse generation and wherein the apparatus will be simple and reliable and economical to manufacture.

Figure 1:
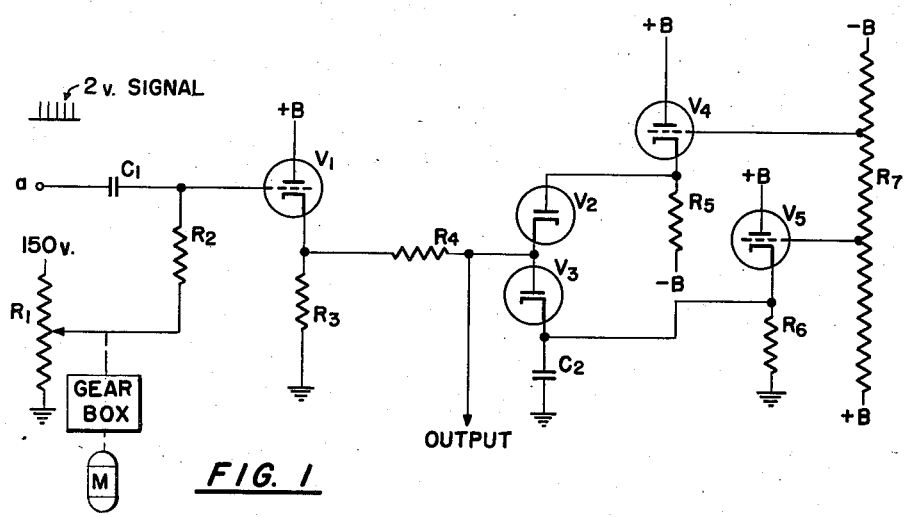
Figure 2:
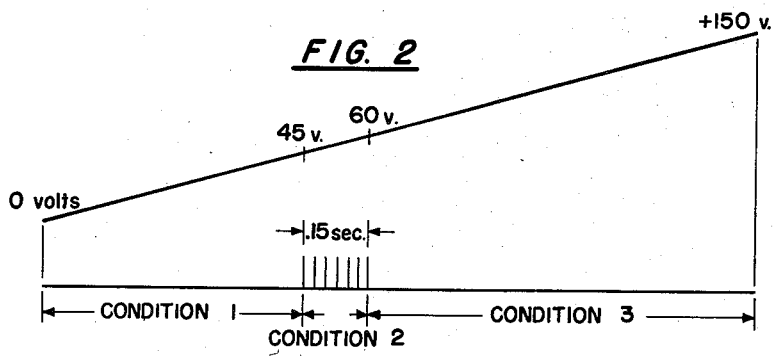

Other objects and many of the attendant advantages of this invention will be readily appreciated as the same becomes better understood by reference to the following detailed description when considered in connection with the accompanying drawings wherein:

Fig. 1 is a schematic representation of a preferred embodiment of the discriminator gating circuit of the invention, and, Fig. 2 is a graphical representation of operating conditions during an illustrative use of the preferred embodiment of the invention.

Referring to the drawings and in particular to Fig. 1, a potentiometer R1 may have its resistive ends respectively disposed between a source of voltage, as 150 volts and ground. The slider arm (not numbered) of potentiometer R1 is connected through resistor R2 to the grid of a cathode follower V1. Means for coupling an input signal through coupling capacitor C1 from an input signal source (not shown) are provided at $a$. The input signal and the variable D.C. of the potentiometer are imposed on the grid of cathode follower V1. Resistor R2 is included so that the pulsed signal is not by-passed to ground when the potentiometer is at zero or ground potential. Means such as a motor connected through a reducing gear train may be provided for mechanically driving the slider arm of potentiometer R1. The increment voltage that is to be selected is impressed on the grids of cathode followers V4 and V5.

In the example illustrated values were chosen and are shown on the drawings merely by way of example for application to an antenna stimulator. An increment of 15 volts was chosen from a potentiometer varying from 0 (zero) to 150 volts. This 15 volt increment was to be adjustable through the travel of the potentiometer and only during this increment was there to be a pulse output out of this circuit. The rate of travel of the potentiometer in this particular instance was 1.5 seconds for the complete length of travel. Therefore the gated increment was .15 second. This duration is extremely long for pulse generation.

In this instance the voltage on the grid of tube V5 (from the contacts on resistor R7) is always 15 volts higher than the voltage on the grid of tube V4. In the antenna simulator application, however, these voltages impressed on the grids of tubes V4 and V5 are varied automatically to represent variation in antenna position. However, to simplify explanation of the inventive circuit it is assumed here that the voltage on the grids V4 and V5 are fixed.

Continuing with the description of the circuit of Fig. 1, appropriate plate voltage is supplied to the plates of tubes V1, V4 and V5 from suitable D.C. power supply sources as indicated at B+. Resistor R3 is the load resistor for the cathode follower V1. Resistor R4 is disposed between the cathode of cathode follower V1 and the junction between the plate and cathode of respective diodes V3 and V2, the plate or anode of diode V2 being connected to the cathode of buffer cathode follower V4. Cathode resistor R5 of follower V4 is connected to a negative voltage source B—. The cathodes of tubes V3 and V5 are joined and resistor R6 and capacitor C2 are in parallel between the joined cathodes of tubes V3 and V5 and ground. Resistance means R7 is connected between appropriate negative and positive voltage sources B— and B+, respectively. The grids of tubes V4 and V5 are connected or disposed at points along resistance means R7 to provide selected increment voltage. Circuit output is taken as indicated from the junction of resistor R4 and the cathode of tube V2. The plate of diode V3 is electrically connected to the cathode of diode V2.

On imposing the input signal from $a$ (which may be 2 D.C. pulses) and the variable D.C. of the potentiometer R1 on the grid of cathode follower V1 and selecting increment voltage from resistor R7 to be impressed on the grids of buffer cathode followers V4 and V5 operation continues as follows:

As the D.C. potential at the slider arm of potentiometer R1 is raised linearly from 0 volts to +150 volts three conditions can exist. One condition possible is to have diode V2 conducting and diode V3 non-conducting. A second condition exists when the voltage of cathode follower V1 keeps both diodes V2 and V3 from conducting. A third condition exists when the potential of the cathode follower V1 rises above the potential of the cathode of diode V3. Under this condition tube V3 conducts while tube V2 is non-conducting.

When the circuit is in condition 1 the plate of tube V2 and the cathode of tube V3 are at a higher potential than the potential of the cathode of the cathode follower V1. Tube V2 therefore conducts and thereby places tube V2, resistor R4 and resistor R3 in parallel with resistor R5. The current through resistor R3 makes the cathode of cathode follower V1 highly positive with respect to its grid and therefore the cathode follower V1 is cut-off and no signal from *a* appears at the output of the circuit. This is illustrated in Fig. 2 at the position indicated condition 1.

When the circuit is in condition 2, the plate of tube V2 is at a lower potential than its cathode and the cathode of tube V3 is at a higher potential than its plate. Neither tube is conducting and the signal from *a* appears at the output. The signal appears for the increment when tubes V2 and V3 are both cut off. This is illustrated in condition 2 of Fig. 2.

When the circuit is in condition 3, the plate of tube V2 and the cathode of tube V3 are at a lower potential than the cathode of tube V1. Tube V3 conducts placing resistor R4, tube V3, capacitor C2 and resistor R6 in parallel with resistor R3. The signal therefore is impressed across the impedance divider comprising resistor R4 and capacitor C2. Since the impedance of resistor R4 is very large in comparison with the impedance of capacitor C2, negligible signal is available at the output of the circuit. This is illustrated in Fig. 2 at the portion indicated condition 3.

The illustrative embodiment shown has disclosed means to provide gating of signals at variable chosen D.C. levels wherein pulse generation would occur for a relatively long gated increment in a system of wide application as for example in antenna simulators and is accomplished in a simple manner and with relatively few components providing an inexpensive system for such a device.

It should be noted that changes in types of components may be effected by one skilled in the art in the scope of the inventive teachings. For example use of electron discharge devices other than tubes, rise of impedances other than resistors, use of other adjustable means than provided by means R7, and other variations in values and parts where possible are contemplated. In the claims the terms anode and cathode are used respectively to indicate any electron collector and emitter, and the term diode to indicate any unidirectional conducting device having the properties of a diode insofar as is required by the invention.

Obviously many modifications and variations of the present invention are possible in the light of the above teachings. It is therefore to be understood that within the scope of the appended claims the invention may be practiced otherwise than as specifically described.

What is claimed is:

1. A signal gating circuit for long pulse duration comprising a cathode follower circuit having signal input means, mechanical means to apply to said cathode follower circuit direct bias voltage the magnitude of which varies linearly as a function of time, and means including fixed bias means to selectively render said cathode follower circuit conductive and non-conductive for the interval during which said variable bias varies between a lower limit and an upper limit of different amplitude determined by said fixed bias means.

2. A signal gating apparatus for long pulse duration at chosen direct current levels comprising a first and a second electron discharge device each of said devices having an anode, a cathode and a control electrode, means to bias said devices at predetermined levels with respect to each other, a first and a second diode connected in series, the plate of said first diode being electrically connected to the cathode of said first electron discharge device, the cathodes of said second diode and said second electron discharge device being electrically joined, a cathode follower, bias means to provide a direct bias voltage the magnitude of which varies linearly as a function of time for said cathode follower, the cathode follower having a cathode electrically joined to the cathode of said first diode and to the anode of said second diode, output terminal means respectively coupled to the cathode and the anode of said first and second diodes, whereby signals introduced to the cathode follower are respectively gated to produce an output signal at said output terminal means for an interval corresponding to the interval during which the amplitude of the variable bias voltage varies between a lower and an upper limit determined by the potential difference between the two levels at which the electron discharge devices are biased.

3. The device of claim 2 including a source of positive voltage and a source of negative voltage and wherein said variable bias means comprises a potentiometer including a wiper having the ends of its resistive element disposed between a source of positive potential and a reference potential and having means coupled to its wiper to continuously translate said wiper along said resistive element, and the means to bias said electron discharge devices comprises an impedance element having ends respectively electrically connected to said sources of positive and of negative voltage.

4. Signal gating apparatus for long pulse duration gating of signals at chosen direct current levels comprising a cathode follower, a source of positive voltage, potentiometer means for biasing said cathode follower having a resistance element connected to said positive source and a reference potential and a wiper arm, means to continuously translate said wiper along said resistive element, said cathode follower having an anode, a control electrode and a cathode, a first resistor disposed between said control electrode and said wiper to prevent grounding of the control electrode at any time, an input coupling capacitor connected to said control electrode to couple input signals to said control electrode, a second resistor disposed between said cathode and ground, a pair of diodes in series each having a plate and a cathode, a third resistor disposed between said cathode follower cathode and the junction between the diodes, output terminal means coupled to the junction of said diodes, a fourth resistor connected between a positive and a negative voltage source, a first and second tap normally spaced apart with respect to each other on said fourth resistor, a first and a second vacuum tube, each of said tubes having an anode, a cathode and a control electrode, said last-named control electrodes being respectively connected to said first and second taps, a fifth resistor in said first tube circuit disposed between a negative source point and the cathode of said first tube, the plate of said first diode being connected to the cathode of said first vacuum tube, a sixth resistor and a capacitor disposed between the cathode of said second tube and ground, the cathode of said second diode being tied to the cathode of said second tube, thereby permitting an output signal to be coupled to said output terminal means for the interval during which the voltage on said wiper varies between a lower and an upper limit determined by the voltage on said first and second taps.

5. A gating circuit comprising: an electron discharge device having an anode, a cathode, and a control element, a resistor connected between said cathode and a point of reference potential, a signal input terminal, circuit means coupling said signal input terminal to said control element, a potentiometer including a wiper having the resistive element thereof connected between a source of potential and said point of reference potential and having the wiper thereof coupled to a means to continuously translate said wiper along said resistive element, circuit means connecting said wiper to said control element, an output terminal coupled to said electron discharge device, and means including fixed bias means coupled to said electron discharge device to thereby permit a signal to be coupled to said output terminal only during the interval that the voltage on said wiper is varied between a lower and an upper limit determined by said fixed bias means.

6. The combination of claim 5 wherein: said means coupled to said electron discharge device further includes a pair of diodes connected in series to said fixed bias means, circuit means coupling the cathode of one of said diodes to said point of reference potential, and circuit means connecting the juncture of said diodes to the cathode of said electron discharge device.

References Cited in the file of this patent

UNITED STATES PATENTS

| | | |
|---|---|---|
| 2,415,919 | Thomas | Feb. 18, 1947 |
| 2,535,912 | Frank et al. | Dec. 26, 1950 |
| 2,639,386 | Karpeles | May 19, 1953 |
| 2,689,952 | Johnson et al. | Sept. 21, 1954 |
| 2,781,445 | Stocker | Feb. 12, 1957 |

FOREIGN PATENTS

| | | |
|---|---|---|
| 542,911 | Great Britain | Feb. 2, 1942 |
| 639,183 | Great Britain | June 2, 1950 |

OTHER REFERENCES

"Ignition Interference Suppression on the Televisor," Electronics Engineering, vol. 20, No. 246, page 253 (August 1948).